United States Patent [19]

Oberg

[11] Patent Number: 4,991,045
[45] Date of Patent: Feb. 5, 1991

[54] SUSPENSION ASSEMBLY
[75] Inventor: Gary R. Oberg, Darwin, Minn.
[73] Assignee: Hutchinson Technology, Inc., Hutchinson, Minn.
[21] Appl. No.: 135,936
[22] Filed: Dec. 21, 1987
[51] Int. Cl.[5] .................. G11B 5/49; G11B 21/16
[52] U.S. Cl. ................................................ 360/104
[58] Field of Search ............................ 360/104, 103

[56] References Cited

U.S. PATENT DOCUMENTS

| 3,931,641 | 1/1976 | Watrous | 360/104 |
| 4,167,765 | 9/1979 | Watrous | 360/103 |
| 4,216,505 | 8/1980 | Grant et al. | 360/104 |
| 4,616,279 | 10/1986 | Poorman | 360/103 |
| 4,625,249 | 11/1986 | Iwata | 360/104 |
| 4,645,280 | 2/1987 | Gordon | 339/17 |
| 4,647,998 | 3/1987 | Onohara et al. | 360/105 |
| 4,705,720 | 11/1987 | Kundinger et al. | 428/332 |
| 4,707,394 | 11/1987 | Chant | 428/209 |

FOREIGN PATENT DOCUMENTS

| 121057 | 10/1984 | European Pat. Off. |
| 12815 | 1/1977 | Japan . |
| 19015 | 2/1978 | Japan . |
| 104787 | 3/1978 | Japan . |
| 93388 | 2/1981 | Japan . |

OTHER PUBLICATIONS

IBM Technical Disclosure, vol. 18, No. 11, 4/19/76, Watrous, p. 3813.
IBM Technical Disclosure, vol. 23, No. 8, 1/1981, Church et al., p. 3873.
IBM Technical Disclosure, vol. 11, No. 3, 8/1968, Rynders et al., p. 24.
IBM Technical Disclosure, vol. 21, No. 8, 1/1979, Norwood, p. 3093.
DuPont Puralux Flexible Composites, Oct. 1968, pp. 6-9.

Primary Examiner—Robert S. Tupper
Attorney, Agent, or Firm—Dorsey & Whitney

[57] ABSTRACT

Hybrid suspension arm assemblies for use in magnetic head/arm assemblies. The suspension arm assemblies utilize plastic components in conjunction with steel to provide excellent damping and rigidity. The hybrid suspension assembly requires much more input amplitude before resonance would become a problem.

19 Claims, 5 Drawing Sheets

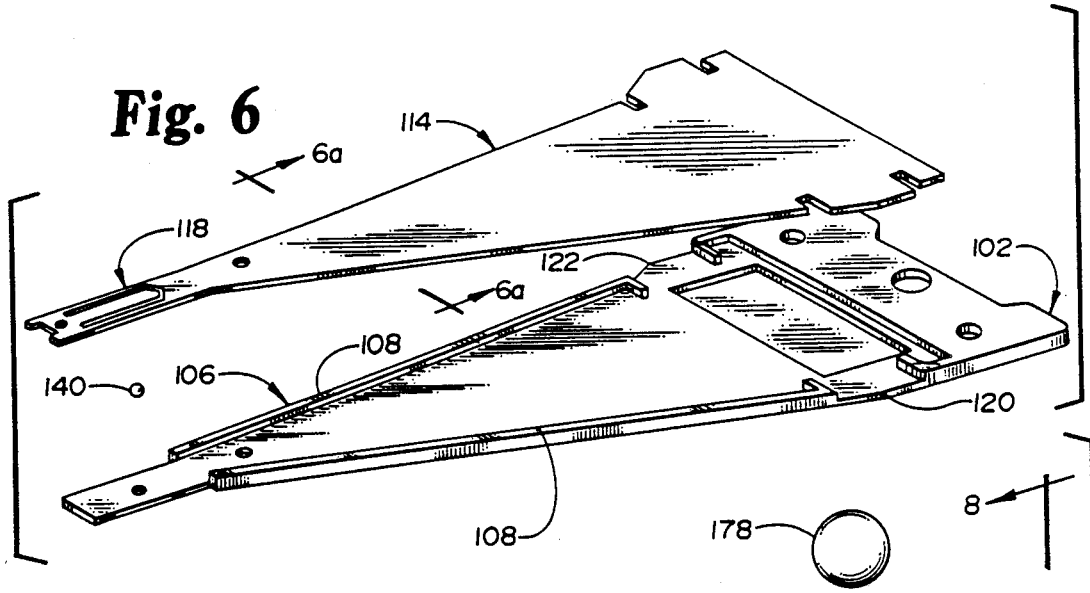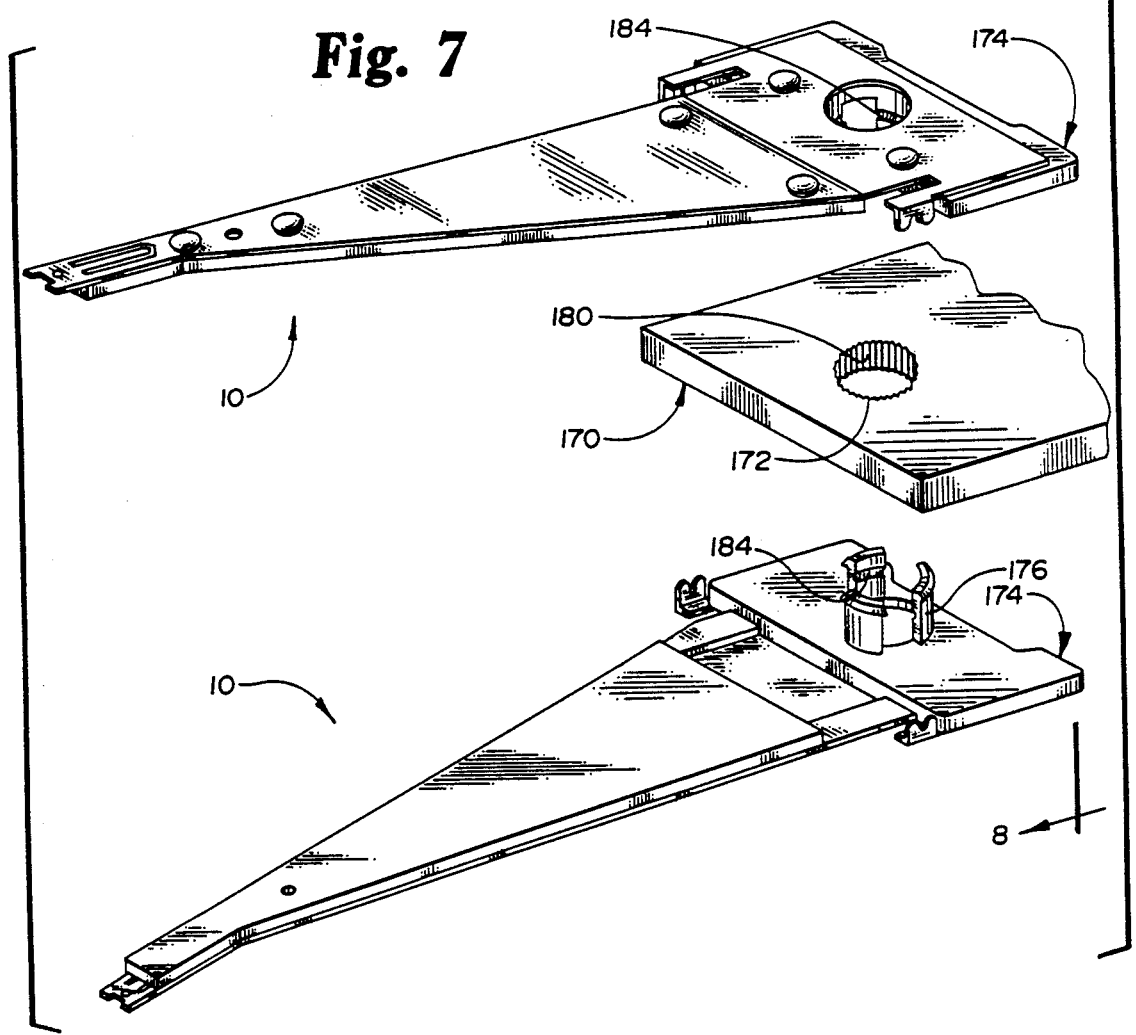

SUSPENSION ASSEMBLY

FIELD OF THE INVENTION

This invention relates to magnetic recording and reading apparatus of the type including magnetic head/arm assemblies. More particularly, the invention relates to novel suspension arm assemblies which are hybrids of plastic and steel.

BACKGROUND OF THE INVENTION

In magnetic head arm assemblies which are employed for radially accessing different data tracks on rotating magnetic disks many different forces may vary the spatial position of the head transducing gap relative to the data track that is being scanned. Heads experience undesirable radial and circumferential forces as well as yaw moments. Head loads are on the order of 15 grams or less. The effect of radial and circumferential forces that are applied to the head arm must be minimized and yaw should be eliminated. Additionally, resonance damping is highly desirable if it can be achieved while still allowing the necessary flexibility of movement for roll and pitch while realizing rigidity against radial, circumferential and yaw motions.

Prior attempts to solve these problems are exemplified in U.S. Pat. Nos. 3,931,641 and 4,167,765. to Watrous. Suspension assemblies have often been termed as winchester flexures and whitney suspension mechanisms.

In every suspension assembly, it is necessary to provide electrical connections between the reading and writing head and an actuator assembly. In making the electrical connection, the conductors and necessary insulation should not adversely effect the performance of the suspension assembly. Also, the point of connection between the suspension assembly and the head itself should be made to eliminate or minimize any bias effects due to stiffness of the electrical connection means. Patents such as Gordon et al U.S. Pat. No. 4,645,280 and Poorman U.S. Pat. No. 4,616,279 are representative of prior solutions to electrical connection problems. Poorman, as an example, completely removes insulation from conductors in the area between the head and the suspension assembly.

BRIEF SUMMARY OF THE INVENTION

The present invention solves the above mentioned problems by forming a novel suspension arm assembly which combines stainless steel with novel "composite" plastics including fiber reinforced polyetherimides and filled or unfilled liquid crystal polymers or other plastics which have sufficient stiffness and damping properties. The plastics are selected to provide excellent stiffness while providing damping which virtually eliminates resonance problems.

Previous suspension arm assemblies have been formed from stainless steel throughout the structure. The flexures, load beams, spring and base plates have all been formed of stainless steel. While the stainless steel provides excellent rigidity, it also gives rise to problems with resonance. The present invention provides a hybrid suspension assembly utilizing the desirable properties of steel with speciality plastics that have inherent internal damping characteristics to create a superior suspension arm assembly.

In one form of the invention, the suspension arm assembly is comprised of a plastic base plate, stainless steel spring, plastic load beam and stainless steel flexure. The plastic chosen for the load beam provides excellent rigidity along the longitudinal axis of the load beam. Unlike stainless steel, the plastic load beam has excellent damping properties.

In an alternative form of the invention, the suspension arm assembly comprises a single piece of stainless steel including a flexure which extends through the length of the entire assembly. A plastic base plate is secured to the stainless steel on the end remote from the flexure and a plastic load beam element is secured to the stainless steel adjacent the flexure and extending up toward the base plate. Like the other embodiment of the invention, this suspension arm assembly has excellent rigidity and excellent dampening properties. Both allow the use of a stainless ball bearing as a load protuberance which greatly decreases costs in manufacturing and provides better tolerance control, and gimbal action.

In both forms of the suspension arm assembly described above, electrical connections extend between the base plate end and the flexure to connect a head which will be secured to the flexure. Preferably, the electrical connections employ a flexible circuit consisting of conductive traces which are laminated in an insulating film. In order to minimize the height of the suspension arm assemblies, it is possible to secure the flexible circuit to the suspension arm assembly by placing it between the stainless steel components and the plastic components. This also eliminates the need for wire captures and center tangs, thus providing a very low profile suspension arm assembly. Alternately, wire capture grooves could be molded into the load beam.

Another feature of the invention deals with the flexible circuit as it passes from the suspension arm assembly to the head. In that region the flexible circuit is typically unsupported. That region is referred to as a pigtail due to its bent shape. In the pigtail region of the invention, a flexible circuit is utilized which minimizes the effect of the electrical connection on the "flying" performance of the head. This is accomplished by utilizing a very thin polyimide film base to which the conductive traces are adhered. It is also possible to copper clad the polyimide base without adhesive. Fortin Industries, Inc., of Sylmar, Calif., produces a copper-polyimide composite under its brand name Fortin Microclad ™ which is suitable herein. Other suppliers of suitable non-adhesive composites include Andus of Canoga Park, Calif. Optionally, the conductors may be covered by a similar very thin polyimide film. In the most preferred form, cuts are made between each of the conductors along a portion of the pigtail such that each conductor may flex independently of the other. Thus, each very small conductor remains spaced from the others and does not act as a single, more rigid cable which would effect the flying performance of the head.

Another alternative for handling the circuitry is to adapt molded circuit board (MCB) technology to the hybrid suspension assembly components of the invention. Photoselective plating processes may be utilized to add conductive traces to the composite plastics. The composite plastic parts may be molded and prepared for ultraviolet exposure of a photoimage followed by plating with copper. This dispenses with plating resists. Other procedures form circuit traces in the plastic mold as raised lands. Fillers, added to the resin in the first shot renders it plating catalytic. The first shot is then placed in a second cavity and a second shot of noncatalytic resin is molded around it. Next, an adhesion promotion step is performed and, finally, a fully additive copper plating operation is conducted. There are a number of other processes which will produce molded circuit boards. The methods used therein may be utilized in making the novel hybrid suspension assemblies of this invention.

Methods described in U.S. Pat. No. 4,698,907, the disclosure of which is incorporated herein by reference, may also be utilized to provide the electrical pathway on the composite plastic parts of the invention.

BRIEF DESCRIPTION OF THE DRAWINGS

The detailed description of the invention including its preferred embodiments are hereinafter described with specific reference being made to the drawings in which:

FIG. 6 is an exploded perspective showing an alternative method of staking the plastic to the metal components of the invention;

FIG. 7 is an exploded view of two suspension assemblies and means for mounting to a single actuator arm;

DETAILED DESCRIPTION OF THE INVENTION

Figure 1:
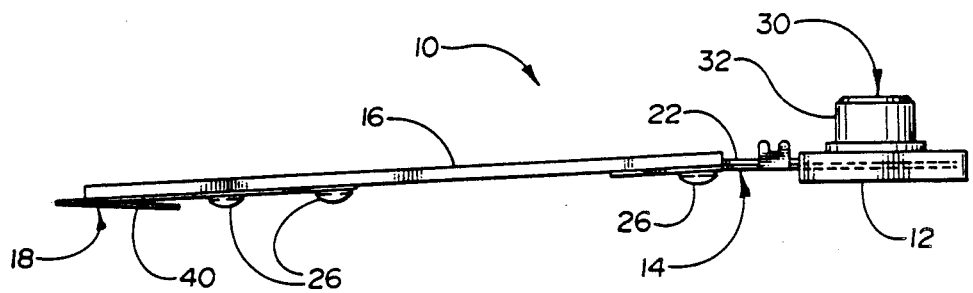
FIG. 1 is a side elevation view of a hybrid suspension arm assembly of the invention.
Figure 2:
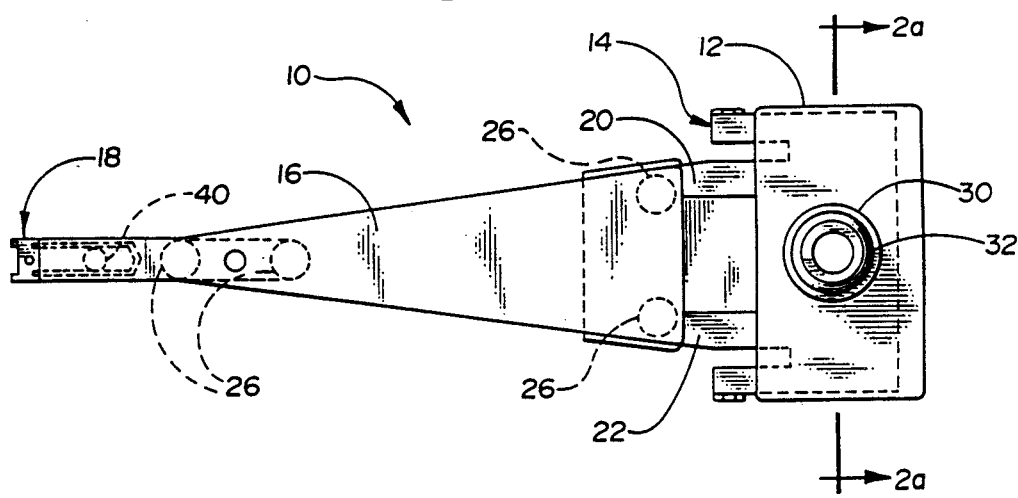
FIG. 2 is a top view of the suspension arm assembly of FIG. 1.

With reference to FIGS. 1 and 2, a novel hybrid suspension assembly 10 is shown. Assembly 10 is comprised of a composite plastic base plate 12, spring 14, composite plastic load beam 16 and a flexure 18. Base plate 12 is securable to an actuator arm (not shown) which may carry a multiplicity of head/suspension assemblies.

Base plate 12 and load beam 16 are each constructed of a composite plastic which provides high unidirectional mechanical properties to provide the rigidity required in suspension assemblies. Polyetherimides, which are amorphous high performance thermoplastics provide excellent rigidity, strength, dimensional stability and electrical properties. When suspension assemblies are made with suitable plastics reinforced with glass fiber or carbon fibers, polyetherimides should have better performance than the prior stainless steel suspension assemblies. The plastics have a great advantage over stainless steel in that their damping properties are excellent. At resonance, the input amplitude of the base plate end would have to be increased 30 to 40 times to obtain an equivalent output amplitude of the flexure end for an all-steel suspension assembly. Suitable polyetherimides are available from General Electric Co. of Pittsfield, Mass. under the trademark ULTEM. Chemically polyetherimide is a 2.2-Bis (4-(3,4-dicarboxyphenol) phenyl) propane dianhydride-m-phenylene diamine copolymer. ULTEM 2000 series are glass reinforced with 10–40% glass. Dimensional stability and rigidity are excellent.

The use of any of the composite plastics referred to herein provides a substantial weight savings. A standard Whitney suspension currently weighs about 0.3 grams while the hybrid Whitney suspension can weigh as little as 0.195 grams. The lighter mass may reduce access time by eight percent.

Other suitable composite plastics include liquid crystal polymers (LCP) which exhibit highly ordered structures. The morphology of LCP's is particularly susceptible to orientation during processing. In solids, uniformly dispersed fiber-like aggregates are observed, forming wood-like structure described as self-reinforcing polymers. The very high unidirectional mechanical properties of LCP are utilized in the load beam and base plate to replace previous stainless steel constructions. The mechanical damping is excellent.

LCP's are available from Celanese Speciality Operations, Celanese Corporation, Summit N.J. under the trademark Vectra TM. Vectra brand resins are primarily aromatic co-polyesters based on p-hydroxybenzoic acid and hydroxy naphthoic acid monomers. Over 70 variants of naphthalene based resins are available including grades with fillers such as glass fibers, graphite flake, carbon fibers, mineral fibers and particular fillers. LCPs under the trademark Xydar TM are available from Dartco Manufacturing Co. of Augusta, Ga. Xydar brand resins are polyesters based on terephthalic acid, p,p'-dihydroxybiphenol and p-hydroxybenzoic acid. Filled and unfilled grades are available. Chemically, Xydar resins may be expressed as 4,4'-Dihydroxydiphenyl-p-hydroxybenzoic acid terephthalic acid polymers.

Both base plate 12 and load beam 16 are preferably formed of composite plastic in which the orientation or grain, if present, runs along the longitudinal axis of the suspension assembly. Base plate 12 is connected to load beam 16 via a stainless steel spring 14. It is also possible to form the base plate and load beam in one molding step, leaving a pair of composite plastic stabilizer bars 20, 22 connecting the load beam 16 and base plate 12. One piece units of base plate, load beam and stabilizers provide for easier assembly. The stabilizer bars, if present, would neck down as shown in FIG. 1 such that they function as a hinge and have a minimal pre-load effect.

The load beam 16 is connected to a stainless steel flexure 18. Flexure 18 may present a substantially rectangular flexure having two parallel, flexible narrow fingers and a relatively stiff cross leg as shown and desired in U.S. Pat. No. 3,931,641 or it may be a single piece having a stiff cross leg offset to support a slider as shown in U.S. Pat. No. 4,167,765. U.S. Pat. Nos. 3,931,641 and 4,167,765 are incorporated herein by reference. Except for certain improvements referred to herein regarding the flexure 18, any flexure designed to carry a slider or head may be utilized in this invention.

As shown in FIG. 1, the base plate and load beam are secured to the stainless steel spring and flexure by ultrasonically or heat staking plastic which extends through spaced openings through the steel members. The weld joints are generally designated as reference 26.

Figure 2A:
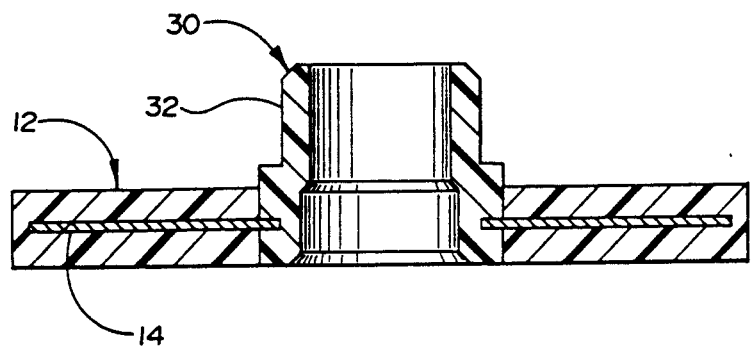
FIG. 2A is a cross-sectional view through the base plate, spring and barrel of FIG. 2 taken along lines 2A—2A.

As shown in FIGS. 1, 2 and 2A, the inventive suspension assembly also includes a novel connecting means for securing the assembly to an actuator assembly. The base plate includes a swagable barrel 30 captured between openings through base plate 12 and spring 14. Barrel 30 may be similar to a standard tubular rivet. Portion 32 of barrel 30 extends below the suspension assembly such that it may be received in a mating aperture in an actuator arm. Connection may be then made by using a riveting device to expand portion 32. This greatly simplifies the process of connecting suspension assemblies to their mounts. Prior screw mounts are labor intensive and requires more expensive components.

Figure 8:
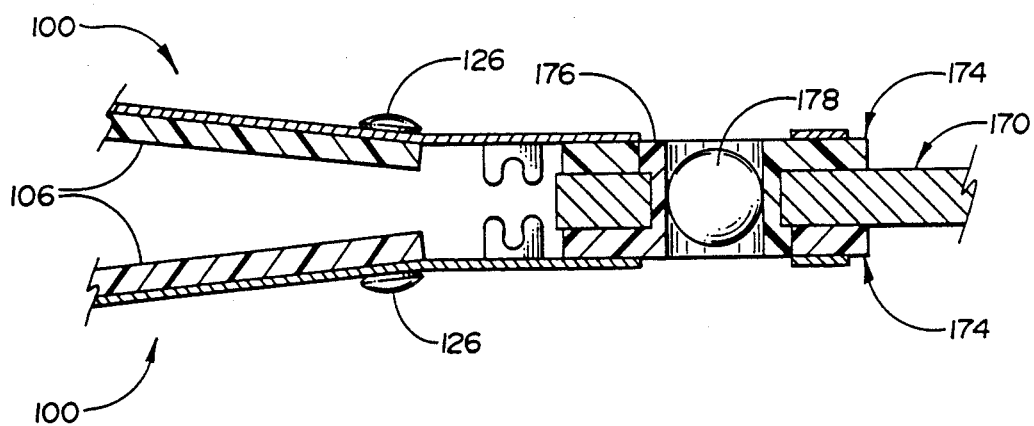
FIG. 8 is a partial cross-sectional view of the invention of FIG. 7 through line 8—8.

A mechanism similar to the swagable barrel discussed above may be utilized to attach two suspension assemblies to one actuator arm. As shown in FIGS. 7 and 8, a pair of suspension assemblies 10 are connected to a single actuator arm 170. Actuator arm 170 has a hole 172 cut therethrough. Each suspension assembly 10 has a composite plastic base plate 174 which include molded fingers 176 which may extend through hole 172 of the actuator arm 170. Fingers 176 are designed to distort upon being pushed through hole 172 and to snap back into position after passing through hole 172 as shown in FIG. 8. Each suspension assembly 10 is snapped into position with the fingers 176 extending through both sides of the actuator arm 170 as shown in FIG. 8. A ball 178 is then pressed into hole 172 which forces the fingers 176 on each base plate against the inside of hole 172 in actuator arm 170. Ball 178 will fit a groove 184 in fingers 176. For even better gripping, the edges of the actuator arm 170 which define hole 172 may be serrated or splined 180. Thus, some of the plastic of the fingers 176 will tend to flow into the spaces formed by serrations or splines 180 by ball 178. This provides good holding power, ease of installation and a low profile assembly and can be removed by pressing the ball out of the pocket. Although shown with two suspension assemblies 10, the method is usable to secure a single assembly to an actuator arm.

Flexures require a load protuberance, typically formed as a dimple on the center tongue of the flexure. The load protuberance contact the load beam and serves as a pivot point about which the head or slider may pitch and roll to follow the changing topography of the disk.

Rather than forming a dimple or load protuberance in the metal of the flexure, the present invention utilizes commercial ball bearings 40 which are secured to the flexure. Ball bearings are inexpensive and eliminates the precision forming needed to make satisfactory formed dimples. Ball bearings have far better finishes and controlled geometries than previous formed load protuberances. Dimple forming also causes a flatness problem in the tongue of the assembly. As shown, the ball bearing 40 is embedded into the load beam such that the protruding lower hemisphere may contact the flexure. The use of ball bearings for a gimbal allows a lower gimbal point which provides greater stability and better flying characteristics. The ball bearing provides better tongue flatness control and the smoother dimple improves flying performance.

Figure 3:
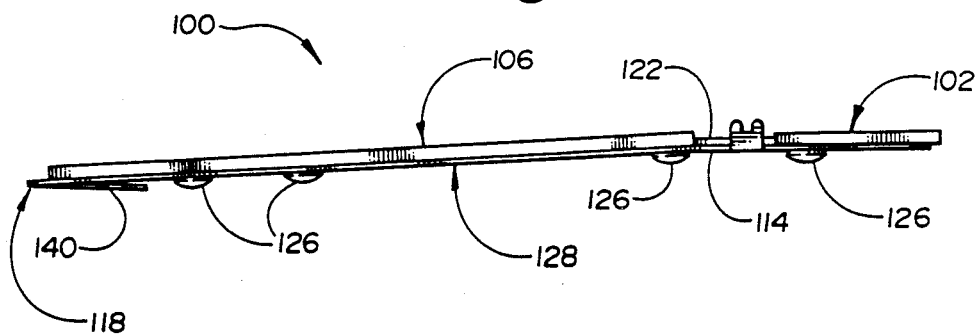
FIG. 3 is a side elevation view of another embodiment of the hybrid suspension arm assembly invention.
Figure 4:
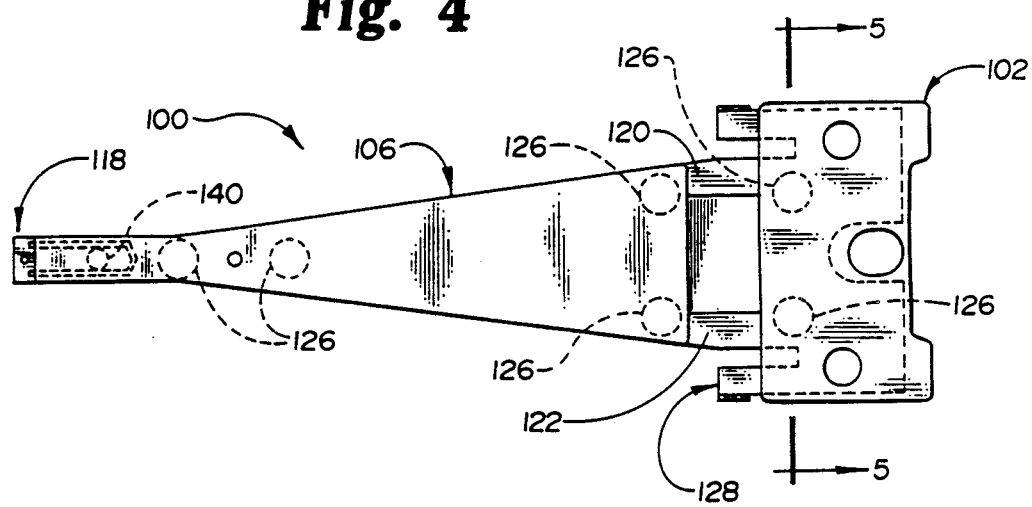
FIG. 4 is a top view of the suspension arm assembly of FIG. 3.
Figure 5:
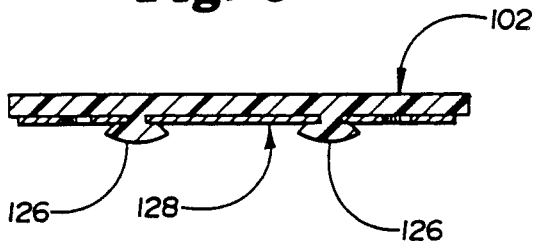
FIG. 5 is a cross-sectional view through the base plate and spring of FIG. 4 taken along line 5—5 to show the attachment of the base to the spring.

In another form of the invention, the spring and flexure are formed as a single piece from stainless steel. With reference to FIGS. 3 and 4, it will be seen that the suspension assembly 100 includes a composite plastic base plate 102 and a composite plastic load beam 106 which may be joined with a pair of plastic stabilizer bars 120, 122. However, as shown, the preload spring and flexure are formed in one piece, designated as element 128. Element 128 has a region 114 which functions as a spring and a flexure 118. Flexure 118 preferably includes the novel ball bearing load protuberance 140 as described above using ball bearings 40 of the invention. Element 128 is secured to the base plate 102 and load beam 106 by ultrasonic weld or heat stake joints 126 in a manner as described previously. Alternatively, the composite plastic may be staked over the steel which is coined to match the plastic configuration. See FIG. 6. The base plate may include the novel swagable barrel as described previously.

Figure 6A:
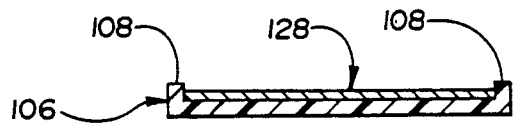
FIG. 6A is a cross-sectional view of the staked suspension of FIG. 6 through line 6A—6A.

With reference to FIG. 6, an alternative method of attaching the composite plastic elements to the steel elements of the suspension assembly is shown. As shown, the composite plastic may be staked over the steel which is coined to match the plastic configuration. An ultrasonic horn melts the composite plastic edges 108 down over the steel to make a low profile mount. Heat or cold staking techniques may also be utilized depending on the plastic. Other means specific to the plastic may be employed.

The one piece spring and flexure shown as element 128 allows greater precision on critical dimensions of the assembly. The composite plastic load beam and base plate provide excellent rigidity and virtually eliminates resonance problems.

In both forms of the invention, circuitry between an actuator assembly and the head is readily handled through the use of a flexible circuit consisting of conductive traces and a flexible, insulating material such as the polyimide sold under the trademark Kapton from E. I. du Pont de Nemours of Wilmington, Del. The flexible circuitry is generally shown in the figures as 150. As shown in FIGS. 9-13, circuitry 150 includes conductive traces 152 bonded to a thin layer of polyimide insulation 154. Insulation layer 154 must be flexible and should not adversely affect the head performance or head load. Layer 154 is preferably formed from polyimide having a thickness of less than about 0.001 inches, and most preferably, about 0.0005 inches. The conductors 152 are adhered to the insulating layer by a modified acrylic adhesive 156. Of course, as stated previously, other methods of forming conductors on the insulating layer are included within the scope of this invention.

Figure 9:
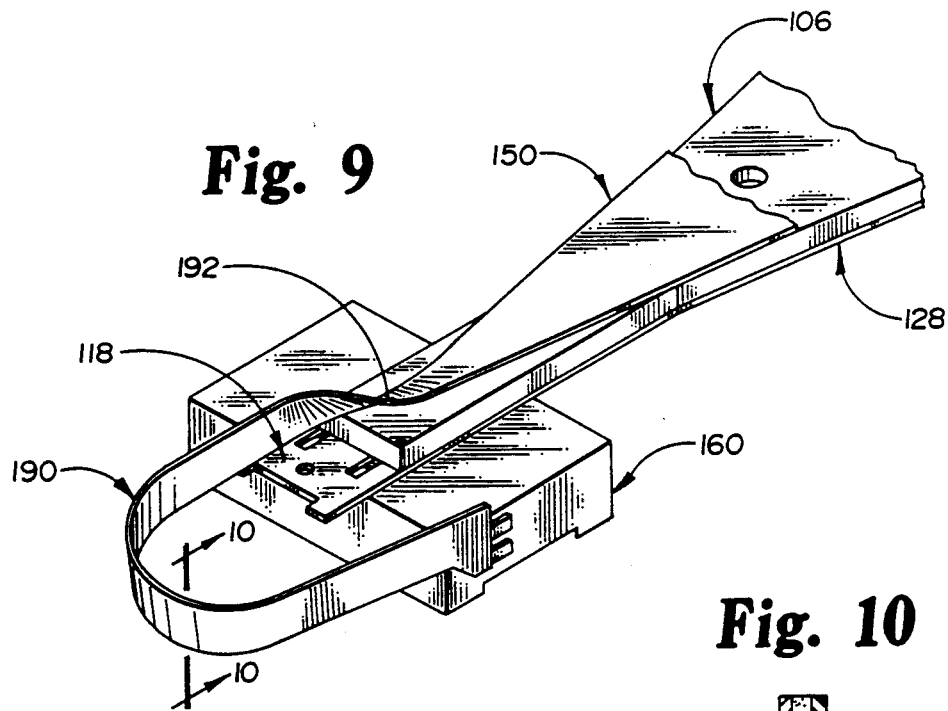
FIG. 9 is a perspective view of a pigtail electrical connection between a head and the suspension assembly.

As referred to previously, the invention also involves the electrical connection between the suspension arm and head 160. In the region in which the flexible circuit 150 is unsupported between the head 160 and load beam the circuit is referred to as a pigtail 190 due to its bent shape. As shown in FIG. 9, the pigtail 190 includes a twist 192 adjacent the load beam end as shown. The twist 192 preferably should be adjacent to the load beam to minimize the effect on the flying performance of the head 160.

Figure 10:
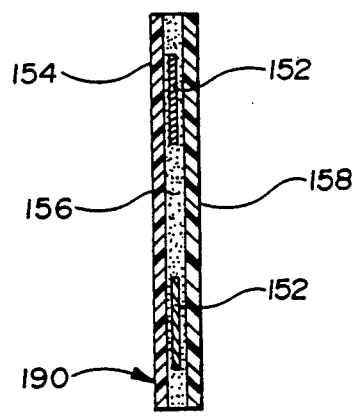
FIG. 10 is a cross-sectional view through the pigtail electrical connection along lines 10—10.

FIG. 10 shows a cross-section through pigtail 190 of FIG. 9. It shows the lower insulating layer 154 to which conductors 152 are attached. As shown, conductors 152 are attached via acrylic adhesive 156. Other techniques are suitable so long as conductive paths are on an insulating layer.

Figure 11:
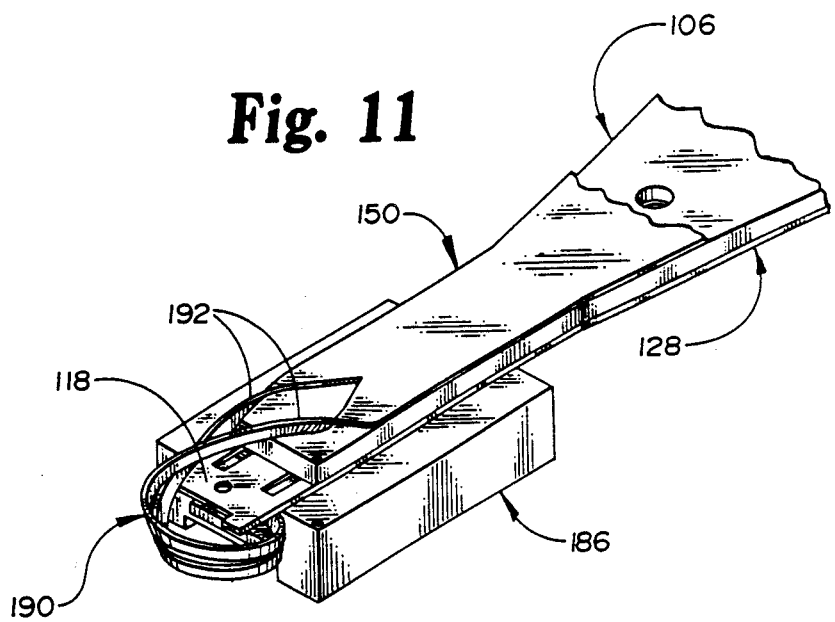
FIG. 11 is a perspective view similar to FIG. 9 in which each conductor is isolated from the others.
Figure 12:
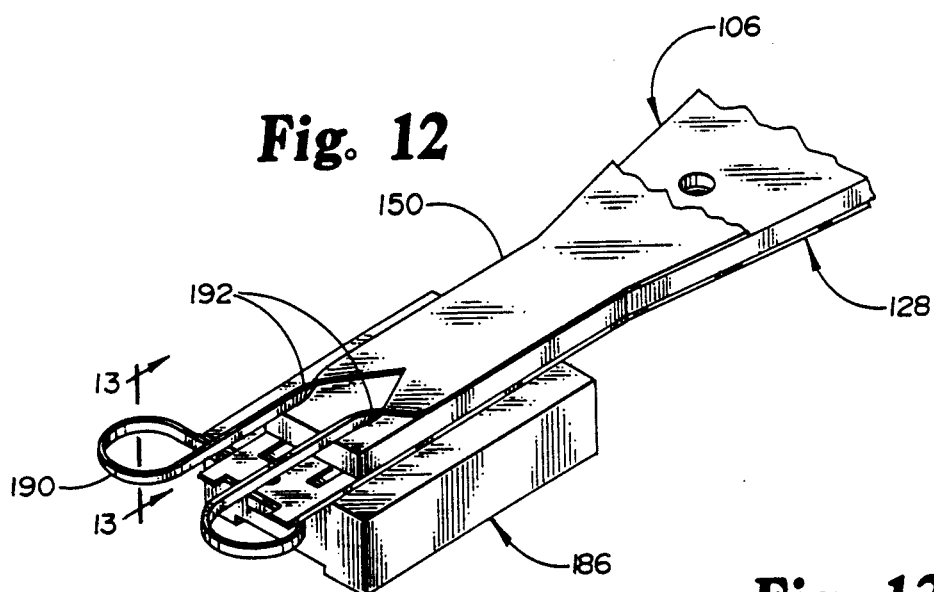
FIG. 12 is a perspective view similar to FIG. 11 in which the conductor form opposing loops.
Figure 13:
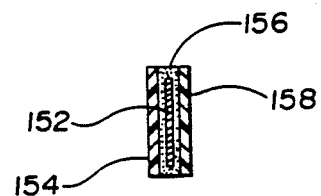
FIG. 13 is a cross-sectional view of FIG. 12 taken through line 13—13 through an alternative pigtail electrical connection.

An alternative pigtail construction is shown in FIGS. 11 and 12. In FIG. 11, each conductor 152 is physically separated from the other by having the lower polyimide layer 154 cut to form separate insulated conductors. If desired, a top layer of polyimide 158 may be applied above conductor 152 with adhesive 156 as shown in FIG. 13. The loops 194 of the pigtail of FIG. 11 both lead to what is commonly referred to as a rotated or "sidewinder" head 186.

Typically, the conductors will be formed from a flat sheet of copper clad polyimide. Using photoresist methods, the copper is etched to remove undesired copper. Any adhesive exposed by the etching process may be removed by plasma etching if desired. If desired, an upper layer of polyimide 158 may be adhered to the top, exposed copper as shown in FIG. 10.

The pigtail construction of FIG. 12 differs from FIG. 11 in that the twists 192 are in opposite direction such that the loops 190 are configured as shown. This construction tends to counter any effect the pigtail and twist may have in the flying performance of the head. In all cases, twist 192 involves a set in the polyimide and conductors close to the load beam end remote from the head to minimize moment effects on the head.

The flexible circuit 150 may be sandwiched between the stainless steel and plastic parts. This decreases the height of the suspension arm assembly and simplifies the capture of the flexible circuit.

In considering this invention it must be remembered that the disclosure is illustrative only and that the scope of the invention is to be determined by the appended claims.

What is claimed is:

1. A suspension arm assembly comprising:
   (a) a base plate member constructed of a non-metallic composite plastic material;
   (b) a spring element joined to said base plate, said spring element being substantially resilient adjacent to said base plate;
   (c) a load beam element constructed of a non-metallic composite plastic material, said load beam element being joined at one end to said spring element and having a free end spaced from said one end, said load beam element being substantially rigid along its length to present a loading force at said free end; and
   (d) a flexure member fastened to said free end of said load beam element, said fixture including a load protuberance which contacts said load beam.

2. The suspension arm of claim 1 wherein said load protuberance is a ball bearing.

3. The suspension arm of claim 1 wherein said base plate member and said load beam element are connected by a pair of spaced stabilizer bars, said stabilizer bars being constructed and arranged of the same composite plastic and functioning as hinge points across said spring element.

4. The suspension arm assembly of claim 1 further including electrical connection means for providing electrical connections along the length of said assembly between said base plate and said flexure, said electrical connection means including a plurality of electrical conductors encapsulated in an electrically insulating film.

5. The suspension assembly of claim 4 further including head means secured to said flexure, said electrical connection means being in electrical connection to said head means, said electrical means forming a pigtail bend having a twist near the end of the load beam between said flexure to said head.

6. The suspension assembly of claim 5 wherein said pigtail bend region of said electrical connection means comprises a plurality of electrically separate conductive traces secured to a polyimide film base having a thickness of less than about 0.001 inches.

7. The suspension assembly of claim 5 wherein said conductors in said pigtail bend are covered by a top layer of polyimide film having a thickness of less than about 0.001 inches.

8. The suspension assembly of claim 6 wherein the pigtail bend region includes cuts between each conductor running the length of the pigtail bend through the polyimide film and adhesive to provide greater flexibility.

9. The suspension arm assembly of claim 4 wherein said electrical conductors are sandwiched between said base plate and spring, said load beam and spring and said load beam and flexure.

10. The suspension arm assembly of claim 6 wherein each conductor and its insulating base is separated from the other conductors and bases.

11. A suspension arm assembly comprising:
   (a) a base plate member constructed of a non-metallic composite plastic material;
   (b) a spring element being joined at one end to said base plate, said spring element being substantially resilient adjacent to said base plate and including a free end spaced from said one end, said spring element including a flexure at its free end, said flexure including a load protuberance; and
   (c) a load beam element constructed of a non-metallic composite plastic material, said load element being joined to said spring element between said flexure and said base plate member, said load beam element being spaced from said base plate member such that said spring element therebetween may function as a spring element, said load beam element cooperating with said spring element where so attached such that the load beam presents a loading force at the free end of said spring element to present a loading force against which said load protuberance may rest.

12. The suspension arm of claim 11 wherein said load protuberance is a ball bearing.

13. The suspension arm of claim 11 wherein said base plate member and said load beam element are connected by a pair of spaced stabilizer bars, said stabilizer bars being constructed and arranged of the same composite plastic and functioning as hinge points across said spring element.

14. The suspension arm assembly of claim 11 further including electrical connection means for providing electrical connections along the length of said assembly between said base plate and said flexure, said electrical connection means including a plurality of electrical conductors encapsulated in an electrically insulating film.

15. The suspension assembly of claim 14 further including head means secured to said flexure, said electrical connection means being in electrical connection to said head means, said electrical means forming a pigtail bend between said flexure to said head.

16. The suspension assembly of claim 15 wherein said pigtail bend region of said electrical connection means comprises a plurality of electrically separate conductive traces secured to a polyimide film base having a thickness of less than about 0.001 inches.

17. The suspension assembly of claim 15 wherein said conductors in said pigtail bend are covered by a top layer of polyimide film having a thickness of less than about 0.001 inches.

18. The suspension of claim 17 wherein the pigtail bend region includes cuts between each conductor running the length of the pigtail bend through the polyimide film and adhesive to provide greater flexibility.

19. The suspension arm assembly of claim 14 wherein said electrical conductors are sandwiched between said spring and said base plate and load beam element.

* * * * *